UNITED STATES PATENT OFFICE.

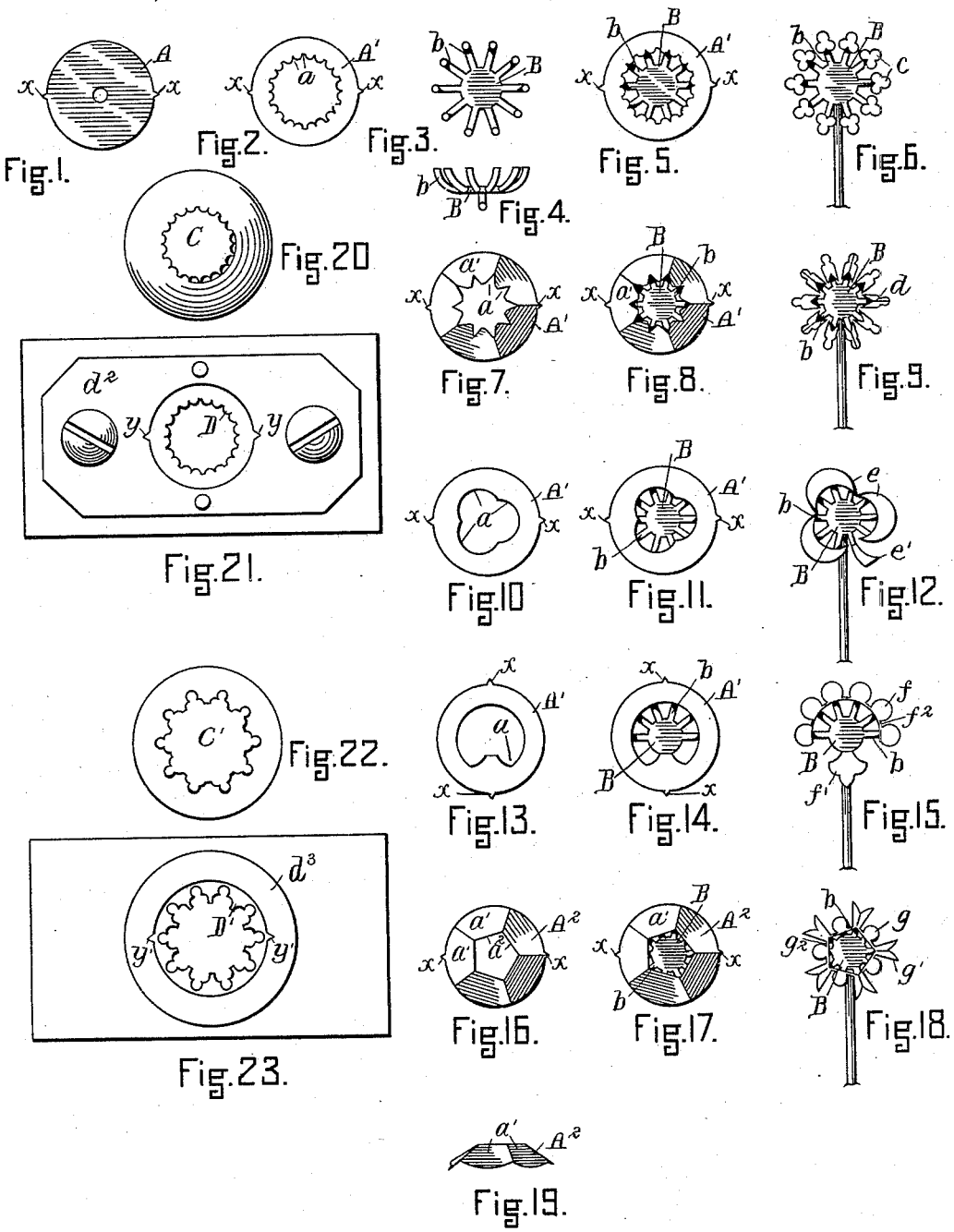

GEORGE C. BUGBEE, OF NORTH ATTLEBOROUGH, MASSACHUSETTS.

METHOD OF MANUFACTURING ARTICLES OF JEWELRY.

SPECIFICATION forming part of Letters Patent No. 469,496, dated February 23, 1892.

Application filed April 20, 1891. Serial No. 389,603. (No model.)

*To all whom it may concern:*

Be it known that I, GEORGE C. BUGBEE, of North Attleborough, in the county of Bristol and State of Massachusetts, have invented a certain new and useful Method of Manufacturing Articles of Jewelry; and I do hereby declare the following specification, taken in connection with the accompanying drawings, forming a part of the same, to be a full, clear, and exact description thereof.

My invention relates principally to the manufacture of what is known as "hard-solder lapped-point work," and particularly to that class of articles which embody what is called a "spray foundation," consisting of a series of arms with patterns or designs secured to the ends of the arms of such spray foundation, such designs being usually arranged so as to form or constitute some general outline or design.

Heretofore in the manufacture of this class of articles the patterns or designs to be secured to the ends of the foundation-arms have been first cut out separately and then separately soldered and secured to the ends of the arms. This method was not only tedious and expensive, but it was extremely difficult to produce thereby regularity and uniformity in the finished article, and especially when the separate patterns or designs were to be arranged so as to constitute some general outline or design, and for the reason that it was not only a difficult matter in the first place to secure a number of separate independent pieces or patterns in regular and uniform position with relation to each other and with relation to the arms of the foundation; but, in addition, the subsequent handling of the article in the process of manufacture and the different operations to which it was subsequently subjected—such as pickling, dipping, coloring, scratch-brushing, &c.—was liable to disarrange or displace the patterns or pieces soldered to the ends of the arms, and even to bend or twist the arms themselves. Furthermore, as the class of articles referred to require to be lapped in finishing, and as to properly perform this operation of lapping it is necessary that a flat and even surface shall be presented to the lap-wheel, it was necessary in the employment of the old method not only to straighten the arms if they became bent, but also, by bending or otherwise, to endeavor as far as possible to get the patterns or pieces of metal secured to the arms into a flat and even condition and in substantially the same plane. This was very difficult, and in fact almost impossible, with the result that the articles produced would not only be irregular in design or appearance, but would also be imperfectly or improperly lapped.

My invention is particularly applicable to the manufacture of that class of articles in which the article as an entirety has a general outline or design and in which this general design is made up by the proper arrangement of a number of smaller individual patterns or designs—as, for instance, a series of cloverleaves arranged in the form of a circle or a number of crescents arranged to form the general outline or design of a clover-leaf.

The object of my invention is to overcome the difficulties above mentioned and to enable articles of the character referred to to be produced with greater regularity or uniformity in outline or design than has been heretofore possible and at the same time with much less trouble and expense.

To that end the first feature of my invention consists in first preparing a blank of suitable shape, next soldering or securing said blank to the arms of the spray foundation, and then simultaneously cutting from this blank thus secured to the foundation-arms the several patterns or designs, as distinguished from first cutting out the patterns or designs separately, and then separately soldering them to the foundation-arms, whereby not only are all of the points or patterns cut out simultaneously and after the blank from which they are cut has been secured to the foundation-piece, but at the same time the general outline or design of the completed article may be formed by the simple and single act of cutting, instead of by separately locating and arranging in place by hand one after the other a series of separate patterns or pieces, as heretofore has been the case.

As in the case of some patterns, it may be inconvenient to cut the blank so as to entirely form either the series of smaller patterns or designs or the general design after said blank has been soldered to the foundation-arms. Another feature of my invention consists in first cutting out the interior of the blank to form a portion of the general design and the corresponding portions of a part or of all of the small patterns or designs, then soldering or securing this partly-cut blank to the foundation-arms, and finally cutting the blank to complete the formation of the small patterns or designs and at the same time forming and completing the remainder of the general design.

The inventions above set forth are likewise applicable in the production of what is known as "faceted" work, and in the production of such work the blank is properly cupped or dapped in suitable dies to form the facets or faces. In cases where the blank is partly cut to form a portion of the designs before being soldered to the foundation-arms, the cupping or dapping may be performed either before or after the blank is thus partly cut, although, as a rule, I prefer to dap or shape the blank to form the facets before any portion of the designs is cut.

Referring to the drawings, Figure 1 represents a blank or wafer. Fig. 2 represents the blank with its center cut out to form the interior of the general design and portions of the smaller patterns or designs. Fig. 3 represents a top view, and Fig. 4 a side view, of the spray foundation. Fig. 5 represents the blank cut, as shown in Fig. 2, soldered to the ends of the arms of the spray foundation. Fig. 6 represents the article as completed by the second cutting, with the several smaller patterns or designs, as well as the general design, entirely formed and showing the article as applied for use as a portion of a scarf-pin. Figs. 7, 8, and 9 are views corresponding to Figs. 2, 5, and 6, but representing a different design and showing a faceted blank and article. Figs. 10, 11, and 12 are also views corresponding with Figs. 2, 5, and 6, but showing a different design, and with some of the smaller designs not entirely separated from each other. Figs. 13, 14, and 15 are also views corresponding with Figs. 2, 5, and 6, but showing a still different design and with the greater portion of the smaller designs formed entirely by the second cutting operation. Figs. 16, 17, and 18 are also views corresponding to Figs. 2, 5, and 6, but showing a different design, and with all of the smaller designs formed by the second cutting operation and connected together by a web of metal, the blank and article being also faceted. Fig. 19 is a side elevation of the blank shown in Fig. 16 and dapped or shaped to form facets, said blank being also such as is employed in producing the forms shown in Figs. 7, 8, and 9. Fig. 20 is a plan view of the plunger; and Fig. 21, a plan view of the cutter employed in cutting out the center of the blank, as shown in Fig. 2. Fig. 22 is a plan view of the plunger; and Fig. 23, a plan view of the cutter employed in performing the second cutting to complete both the smaller patterns or designs and the general design, as represented in Fig. 6.

In carrying out my invention I first take a flat thin sheet of metal, either gold, gold-plate, or any other metal, and cut therefrom a blank or wafer of the proper shape, as round, square, hexagonal, &c., to produce the ultimate designs desired. For the production of all the various designs represented in the drawings the blank may be conveniently cut in circular shape, as at A, Fig. 1. In the case of such a circular blank I preferably cut the blank so that it will have one or more teats or projections $x$, for the purposes hereinafter described.

Starting now with a blank A, as shown in Fig. 1, I will for convenience first describe my improved process as carried out in the production of the design shown in Fig. 6, and which consists of a series of clover-leaves arranged in the form of a circle. By means of the plunger C and cutter D (shown in Figs. 20 and 21) the blank is first cut into the form A', (shown in Fig. 2,) thereby forming the interior of the general design, and at the same time portions of the outlines of the individual clover-leaves, a portion of the serrations or indentations $a$ corresponding to the inner indentations in the clover-leaves, and the remaining alternate indentations corresponding to the spaces between the clover-leaves in the finished article. Next the blank A', with its center thus cut, is soldered to the arms $b$ of the spray foundation B, Figs. 3 and 4, as shown at Fig. 5. To secure the proper location of the partly-cut blank A' to the arms $b$, and so that when the second cut to complete both the general design and the smaller designs or leaves is made each leaf will be centrally located at the end of its appropriate arm, the teats or projections $x$ are of great utility. The cutter D is provided with the usual gage $d^2$, in which gage are formed one or more corresponding notches $y$, Fig. 21, having a certain definite location with relation to the pattern upon the cutter D and plunger C, and by placing the blank A in the cutter D, so that the projections $x$ will enter the notches $y$, the blank A' will be cut with its pattern having a like definite relation to the projections $x$, whereby by using such projections as a guide the workman will be able to quickly and readily locate the blank A' in proper position upon the spray foundation B and solder it, so that when the final cut is made the smaller designs will be properly located with relation to the arms $b$. The spray foundation and the partly-cut blank A' thus soldered to it are then subjected to the usual operations of pickling, dipping, coloring, scratch-brushing, &c. As the partly-cut blank presents a continuous surface, and as it also connects together the arms of the foundation-piece, bridging over the spaces between said arms, there is practically no liability of disarrangement or of bending or twisting the foundation-arms. The foundation-piece, with the partly-cut blank A' soldered to it, is then placed in the cutter D', Fig. 23, with the projections $x$ entering the notches $y'$ in the gage $d^3$ in said cutter to properly locate the blank, and then by means of the plunger C', Fig. 22, the blank is cut to form the exterior of the general design and at the same time to complete the outlines of the several individual small designs—viz., the clover-leaves—thereby producing the series of clover-leaves $c$, arranged in the form of a circle, as shown in Fig. 6. The article is then taken to the lap-wheel and the faces of the clover-leaves lapped in the usual manner. By the use of the method above described the faces of the clover-leaves will be left in a perfectly flat and even condition with all of said faces in substantially the same plane and with the result that all of the faces will be evenly and uniformly lapped, which was not the case with the old method.

The general process above described is the same in the production of all the various designs shown in the drawings, with the exception that in some cases a portion or all of the small patterns or designs are entirely cut after the blank has been soldered to the foundation-piece, instead of being partly cut before. There are also certain modifications in details and in the character of the designs produced, which will now be referred to.

Referring first to the designs represented in Figs. 9 and 18, said designs are what are known as "faceted" or provided with facets or angular faces. In the production of such designs the blank is to be dapped or shaped in suitable dies into the form shown at $A^2$, Figs. 16 and 19, having facets or faces $a'$. In preparing the blank $A^2$, Fig. 19, I prefer to first cut out the center of the blank in proper geometrical form, as at $a^2$, Fig. 16, then to dap or shape the blank to form the facets, and then, for the production of the design shown in Fig. 9, to cut out the interior portions of the designs, forming the indentations $a$, so as to produce the partly-cut blank A', as shown in Fig. 7; but, if desired, the dapping or shaping may be performed after the interior portions of the designs have been cut. The partly-cut blank A' is then soldered or secured to the foundation-piece B, as in the previous instance, and said blank A', thus secured to the foundation-piece, is then by a properly-shaped plunger and cutter cut to complete the small designs $d$, Fig. 9, at the same time completing the general design.

Referring now to the design shown in Fig. 12, in which the general design is that of a clover-leaf, it will be seen that the smaller designs, which make up this general design, are not all the same, being composed of a series of three crescents $e$ to form the leaf proper and an additional smaller design $e'$ to form the stem; and it will also be seen that the crescents are not entirely separated from each other, but are left connected together. If desired, however, the crescents may be severed from each other by having the second cutter cut entirely through the ring of metal, as in the case of the clover-leaves in Fig. 6.

In the general design shown in Fig. 15 likewise two different small designs are employed—viz., the series of circular projections $f$ and the hawthorn-leaf $f'$—and in this case the circular projections $f$ are not entirely separated from each other, but are left connected together by the connecting-web of metal $f^2$. In the production of this design, as will be seen by an examination of Figs. 13 and 14, practically no portion of the circular projections $f$ is formed by the first cutter or before the blank is soldered to the foundation-arms, but only a portion of the outline of the hawthorn-leaf $f'$, the circular projections and all that portion of the general design being formed only by the second cutter and after the blank has been soldered to the foundation-arms. In the case of the hawthorn-leaf $f'$ and that portion of the general design they are formed partly by the first cutter and partly by the second cutter, as in the case of the clover-leaves in Fig. 6.

In the design shown in Fig. 18 all of the smaller designs, which consist of the forms $g$ and $g'$, are left connected together by the connecting-web $g^2$. In the production of this design I make use of a blank such as shown in Figs. 16 and 19; but instead of first cutting this blank to form a portion of the small designs $g$ and $g'$ by one cutter and before the blank is soldered to the foundation-arms and then completing said small designs by another cutter after the blank is soldered to said foundation, as is done in producing the design in Fig. 9, as shown in Figs. 7 and 8, the said small designs $g$ and $g'$ are formed entirely by a single cutter, and after the blank has been soldered to the foundation-arms the first cutting operation, or that which is employed, for instance, in producing the indentations $a$ in Fig. 7, being entirely dispensed with. The same would be the case even if no connecting-web of metal were left between the small designs, and if, instead, the cutter cut entirely through to the central opening in the blank, thus severing the small designs from each other.

By the method above described of first soldering a blank either cut to partly form the smaller designs and the corresponding portion of the general design or otherwise to the ends of the foundation-arms, and then cutting said blank to complete or to entirely form both the general design and the smaller designs which go to make up such general design, as distinguished from first cutting out the several smaller designs and then arranging said smaller designs to form the general design and separately soldering and securing them to the foundation-arms, much greater regularity and uniformity are secured and a more perfect lapping is made possible, resulting in the production of a much better and more perfect article and at much less cost than has been heretofore possible.

The articles produced by the above-described process are shown in the drawings as mounted to form a scarf-pin, but may, of course, be used for any other purpose that may be desired.

What I claim as my invention, and desire to secure by Letters Patent, is—

1. The method of manufacturing articles of jewelry composed of a spray foundation with a series of patterns or designs secured to the arms thereof, which consists in first preparing a blank of suitable shape, next soldering or securing said blank to the arms of the spray foundation, and then cutting said blank to simultaneously form the patterns or designs, substantially as set forth.

2. The method of manufacturing articles of jewelry composed of a spray foundation with a series of patterns or designs secured to the arms thereof in such manner as to form some general design, which consists in first preparing a blank of suitable shape, next soldering or securing said blank to the arms of the spray foundation, and then cutting said blank to simultaneously form the smaller designs and at the same time to form the general design, substantially as set forth.

3. The method of manufacturing articles of jewelry composed of a foundation-piece with a series of patterns or designs secured thereto, which consists in first preparing a blank of suitable shape, then cutting out the interior of the blank, so as to partly form the outlines of the several patterns or designs, then soldering or securing such partly-cut blank to the foundation-piece, and finally by a second cutting operation completing said patterns or designs, substantially as set forth.

4. The method of manufacturing articles of jewelry composed of a foundation-piece with a series of patterns or designs secured thereto in such manner as to form some general design, which consists in first preparing a blank of suitable shape, then cutting out the interior of the blank, so as to partly form the outlines of the several smaller designs and at the same time forming the interior of the general design, then soldering or securing such partly-cut blank to the foundation-piece, and finally by a second cutting operation completing said smaller designs and at the same time completing the formation of the general design, substantially as set forth.

GEORGE C. BUGBEE.

Witnesses:
  W. H. THURSTON,
  S. J. MURPHY.